United States Patent
Burbaum et al.

(10) Patent No.: US 11,999,012 B2
(45) Date of Patent: Jun. 4, 2024

(54) METHOD AND SYSTEM FOR ADDITIVE MANUFACTURING OR REPAIR WITH IN-SITU MANUFACTURING AND FEEDING OF A SINTERED WIRE

(71) Applicant: Siemens Energy, Inc., Orlando, FL (US)

(72) Inventors: Bernd Burbaum, Falkensee (DE); Kazim Ozbaysal, Charlotte, NC (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 925 days.

(21) Appl. No.: 17/040,559

(22) PCT Filed: Mar. 27, 2018

(86) PCT No.: PCT/US2018/024523
§ 371 (c)(1),
(2) Date: Sep. 23, 2020

(87) PCT Pub. No.: WO2019/190475
PCT Pub. Date: Oct. 3, 2019

(65) Prior Publication Data
US 2021/0069832 A1    Mar. 11, 2021

(51) Int. Cl.
*B23K 26/342* (2014.01)
*B23K 35/24* (2006.01)
(Continued)

(52) U.S. Cl.
CPC ............ *B23K 26/342* (2015.10); *B33Y 10/00* (2014.12); *B23K 35/24* (2013.01); *B23K 35/40* (2013.01); *B23K 2103/08* (2018.08)

(58) Field of Classification Search
CPC ...... B23K 26/342; B23K 35/24; B23K 35/40; B23K 2103/08; B23K 2101/001;
(Continued)

(56) References Cited

U.S. PATENT DOCUMENTS

2004/0118245 A1    6/2004   Ott et al.
2008/0141825 A1    6/2008   Thyssen et al.
(Continued)

FOREIGN PATENT DOCUMENTS

CN    201720607 U    1/2011
CN    102922139 A    2/2013
(Continued)

OTHER PUBLICATIONS

PCT International Search Report and Written Opinion of International Searching Authority dated Jan. 21, 2019 corresponding to PCT International Application No. PCT/US2018/024523 filed Mar. 27, 2018.

*Primary Examiner* — Robert G Bachner

(57) ABSTRACT

A system for manufacturing of a sintered wire and in-situ feeding to a laser wire welding system is presented. The system includes a pressure vessel connected to a powder feed system for delivering at least two powders to a powder mixing zone of the pressure vessel. The at least two powders are mixed via a rotating cone in the pressure vessel. After mixing, a heating device contained within the pressure vessel heats the mixture so that liquid phase sintering occurs and a sintered rod is created. The sintered wire is continuously fed to a laser metal deposition system for depositing a layer of additive material on a base material. A method of additively manufacturing or repairing a superalloy component is also presented.

16 Claims, 2 Drawing Sheets

(51) Int. Cl.
*B23K 35/40* (2006.01)
*B23K 103/08* (2006.01)
*B33Y 10/00* (2015.01)

(58) Field of Classification Search
CPC .. B23K 1/0056; B23K 3/063; B23K 26/1464; B23K 26/34; B23K 35/0227; B23K 35/3033; B23K 35/3046; B23K 1/0018; B33Y 10/00
See application file for complete search history.

(56) References Cited

U.S. PATENT DOCUMENTS

| | | |
|---|---|---|
| 2015/0298263 A1 | 10/2015 | Goncharov et al. |
| 2017/0051386 A1 | 2/2017 | Carter et al. |
| 2017/0182558 A1* | 6/2017 | Shimizu ................ B23K 26/38 |
| 2017/0252787 A1 | 9/2017 | Stawovy |
| 2017/0274475 A1 | 9/2017 | Pan et al. |
| 2018/0281125 A1 | 10/2018 | Burbaum |

FOREIGN PATENT DOCUMENTS

| | | |
|---|---|---|
| CN | 104841935 A | 8/2015 |
| CN | 105728728 A | 7/2016 |
| CN | 106552939 A | 4/2017 |
| CN | 107073648 A | 8/2017 |
| DE | 102008038418 A1 | 5/2009 |
| DE | 102015219341 A1 | 4/2017 |
| EP | 0562130 A1 | 9/1993 |
| JP | S49119844 A | 11/1974 |
| RU | 2613006 C2 | 3/2017 |
| WO | 2017096050 A1 | 6/2017 |

\* cited by examiner

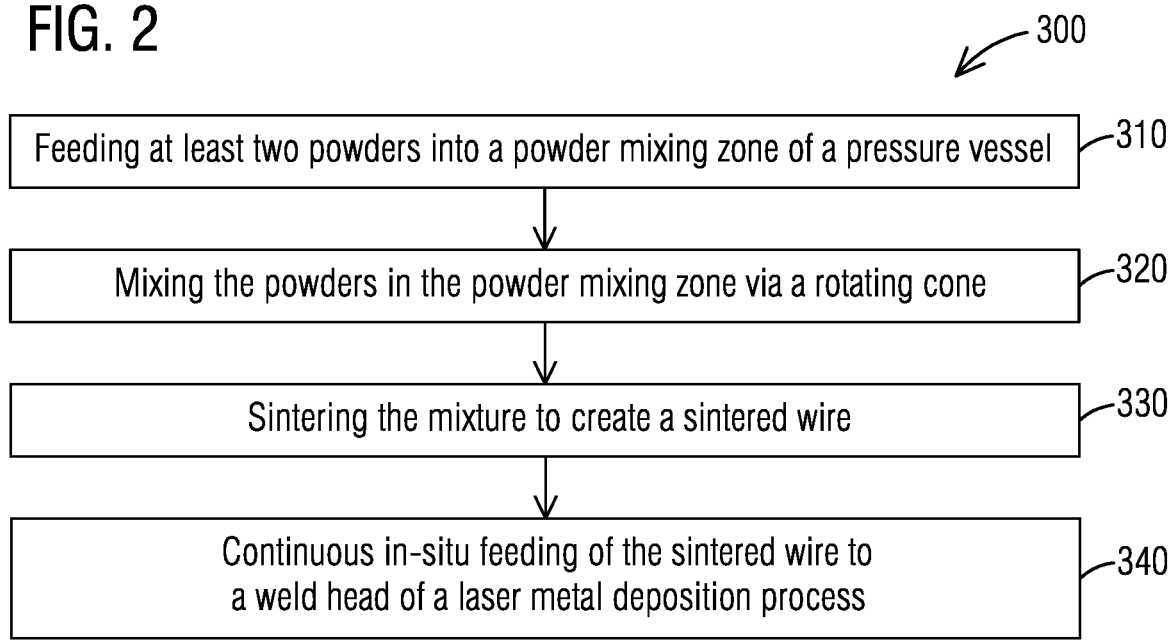
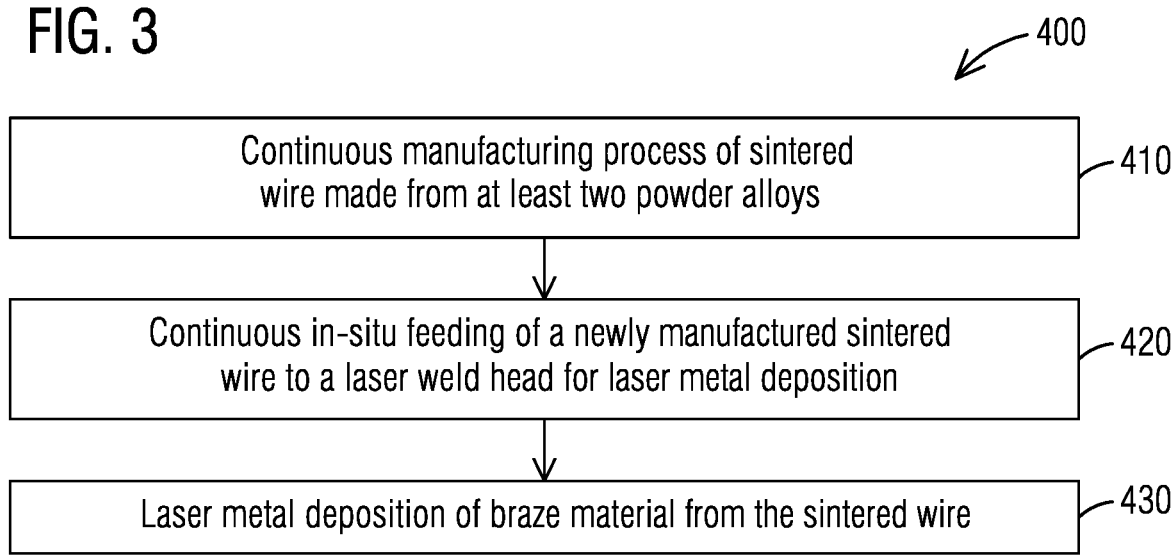

METHOD AND SYSTEM FOR ADDITIVE MANUFACTURING OR REPAIR WITH IN-SITU MANUFACTURING AND FEEDING OF A SINTERED WIRE

BACKGROUND

1. Field

The present disclosure relates generally to the field of materials technology, and more particularly to additive manufacturing and a laser metal deposition process utilizing an in-situ manufactured sintered wire.

2. Description of the Related Art

Weld repair of superalloys presents a variety of technical challenges because of the high strength (and corresponding low ductility) that these alloys are optimized to achieve. Heat sources such as lasers and arcs are being applied to build additively manufactured parts or repair damaged superalloy components. One type of process used for additive manufacturing or repair is a laser metal deposition (LMD) process. LIVID processes utilize powdered materials that are deposited into a melt pool to form layers of an additive material, also known as build-up layer. Unfortunately, LIVID processes using powdered materials are not efficient due to the amount of materials lost during the spraying process, e.g., deposits that fail to enter the melt pool for processing. Additionally, due to the unconfined nature of powdered materials, contaminants may often result end up being deposited along with the powdered materials during the LIVID process. Therefore, a need remains for a more efficient LIVID process, which at least reduces the loss of any materials during the LIVID process, and which reduces or eliminates any contaminants associated with traditional powdered depositions.

SUMMARY

Briefly described, aspects of the present disclosure relate to a system for additively manufacturing and/or repairing a superalloy component via laser metal deposition utilizing a sintered wire and a method of additively manufacturing and/or repairing a superalloy component.

A first aspect provides a system for additively manufacturing and/or repairing a superalloy component via laser metal deposition utilizing a sintered wire. The system includes a pressure vessel connected to a powder feed system for delivering at least two powders to a powder mixing zone of the pressure vessel. The at least two powders are mixed via a rotating cone in the pressure vessel. After mixing, a heating device contained within the pressure vessel heats the mixture so that liquid phase sintering occurs and a sintered wire is created. The sintered wire is continuously fed to a laser wire welding system for depositing a layer of additive material on a base material.

A second aspect provides a method of additively manufacturing and/or repairing a superalloy component. The method includes the step of sintering at least two different powders in a pressure vessel by a heating process so that a sintered wire is created. The sintered wire is continuously fed in-situ to a weld head of a laser wire welding system. The laser metal deposition system directs a laser beam from the laser wire welding system towards a base material of the superalloy component which forms a melt pool on the base material of the superalloy component into which the sintered wire is deposited forming a layer of additive material on the base material.

A third aspect provides a method of manufacturing a sintered wire for in-situ feeding to a laser wire welding system. For the manufacturing of a sintered wire, at least two powders are fed into a powder mixing zone of a pressure vessel where the at least two powders are mixed in a powder mixing zone. The mixture is then heated by a heating device so that liquid phase sintering occurs creating a sintered wire. The sintered wire may then be continuously fed in-situ to a laser weld head for a laser metal deposition process.

BRIEF DESCRIPTION OF THE DRAWINGS

FIG. 2 illustrates a block diagram of a method of manufacture of a sintered wire and in-situ feeding to a laser wire welding system, and FIG. 3 illustrates a block diagram of an additive manufacturing and/or a repair process in accordance with the disclosure provided herein.

DETAILED DESCRIPTION

Figure 1:
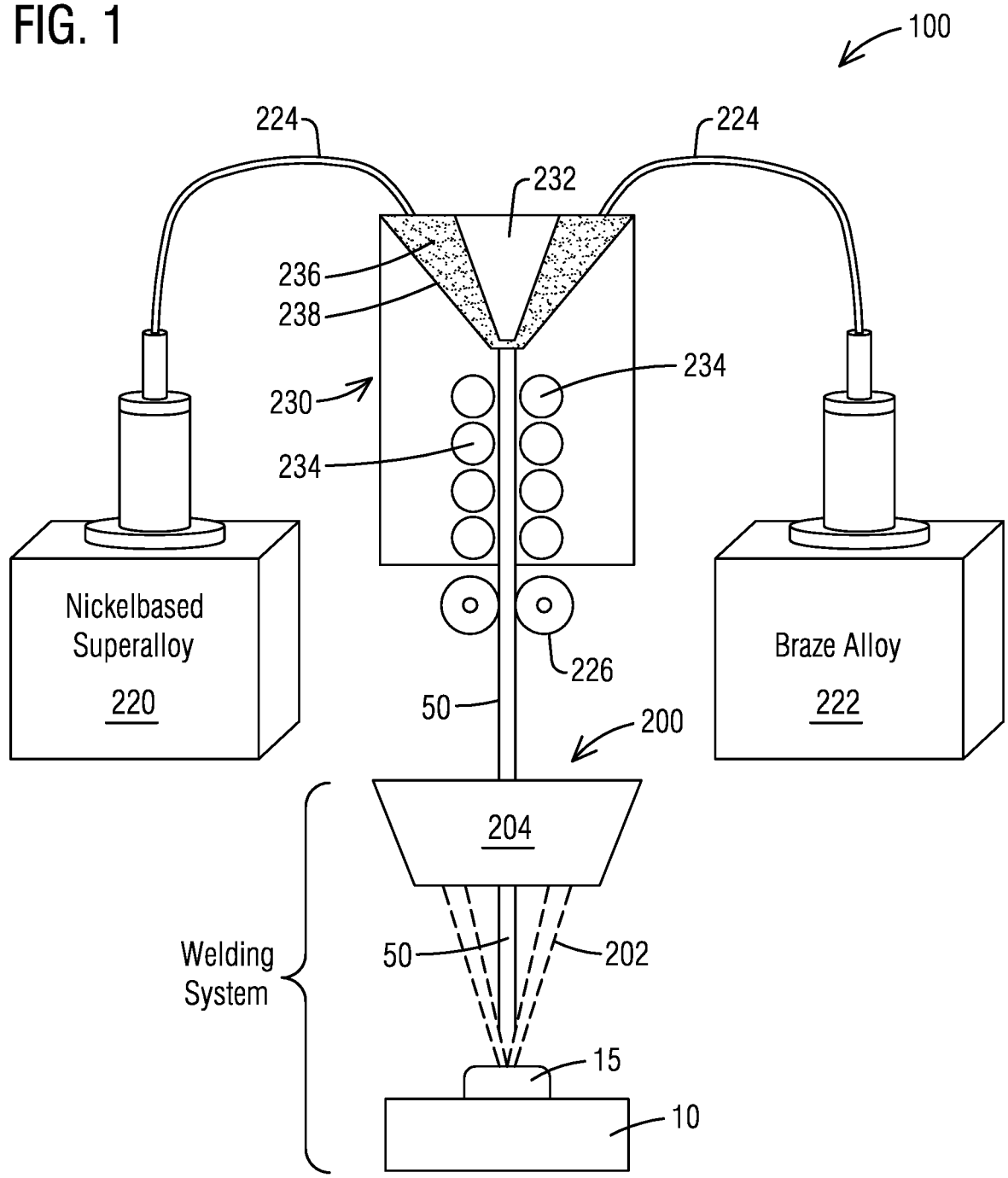
FIG. 1 illustrates a schematic of a system for additively manufacturing and/or repairing superalloy components via laser metal deposition.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Referring now to the drawings where the showings are for purposes of illustrating embodiments of the subject matter herein only and not for limiting same, FIG. 1 illustrates a system 100 for manufacturing a sintered wire 50 for in-situ feeding to a laser wire welding system 200.

The system 100 may include a pressure vessel 230 operably connected to one or more powder feed systems 220, 222. The powder feed system 220, 222 is configured to deliver at least two powders to the pressure vessel 230. In the embodiment illustrated in FIG. 1, two powder feed systems 220, 222 are shown, however, one skilled in the art would understand that more powder feed systems may be added to the system. The powder(s) may be fed into the powder mixing zone 236 of the pressure vessel 230. The powder mixing zone 236 may comprise a container 238 having a rotating cone 232. In the powder mixing zone 236, the rotating cone 232 may be utilized to mix the powders forming a mixture of powders.

The powder feed systems 220, 222 may each include a powder to be delivered, via a respective feed line 224, to a powder mixing zone 236 of the pressure vessel 230. The powders may include a first powder comprising a base metal powder and a second powder comprising a braze alloy powder. The base metal powder may correspond to a base material composition of a component 10 to be laser welded. In an embodiment, the base metal powder comprises a nickel-based superalloy powder. The braze alloy powder may comprise a braze material that includes a lower melting temperature than the base metal powder.

In an embodiment, the mixture of powders may comprise a proportion of base metal powder in the range of (in wt. %) of 60-100% to braze alloy powder in the range of (in a wt. %) of 0-40%. In an embodiment, the braze alloy powder may comprise a braze alloy powder used for nickel or cobalt based superalloys such as Amdry BRB or Amdry DF-4B. The braze alloy powder may also comprise a powder composition selected from the following alloys, Ni—Cr—Ti, Ni—Cr—Zr—Ti, Ni—Ti—Zr, Ni—Cr—Hf—Zr, Ni—Cr—Ti—Hf, and Ni—Cr—Hf—Zr—Ti.

The pressure vessel 230 may include a heating device 234 disposed within the pressure vessel 230, as shown in FIG. 1, in order to perform a sintering process. The heating device 234 may comprise an induction heating system, a furnace, or a combination of both an induction heating system and a furnace, the heating device 234 operable to produce heat up to or beyond a melt temperature of the braze alloy powder, for example temperatures in the range of 1000° C.-1250° C. It should be appreciated that heating devices capable of producing lower or higher temperatures than the above mentioned range may be used depending on the melt temperatures of the chosen braze alloy powders and the base metal powders.

In an embodiment, the heating device 234 heats the mixture to a temperature at which the braze alloy powder begins to melt. It should be noted that the heating temperature of the heating system would be below the melting temperature of the base metal powder so that only the braze alloy powder melts. Upon melting, the braze alloy powder contacts the remaining base metal powder, wetting the powder, so that all the remaining powder sinters together due to the molten braze material. Thus, a liquid phase sintering occurs. In an embodiment, the sintered material may be formed into a sintered wire 50 within the pressure vessel 230. The sintered wire 50 may then be continuously fed via a plurality of rollers 226 disposed on the exterior of the pressure vessel 230 into a laser wire welding system 200.

The system 100 may include a conventional laser wire welding system 200 for applying a laser energy, via a laser energy source 202, to the base material of the component 10 to be welded, and for depositing the sintered wire 50 into a melt pool of the base material resulting from the laser energy to form layers of additive material for manufacturing or repairing the desired component 10. In an embodiment, the component 10 may be a nickel-based superalloy component such as a gas turbine blade or vane. The laser energy source 202 may be operably configured to direct or emit laser energy therefrom and toward the base material for melting portions of the base material to form the melt pool.

In an embodiment, the laser wire welding system 200 includes a welding head 204 for receiving the hot sintered wire 50 directly from the pressure vessel 230. The pressure vessel 230 may continuously heat the at least two powders to sinter wire enabling a continuous in-situ feeding of sintered wire 50 to the welding head 204 of the laser wire welding system 200. In an embodiment, the welding head 204 may be operably connected to the laser energy source 202.

Upon being deposited, the laser energy processes/melts the additive/build up materials, which subsequently solidifies to form a layer 15 of additive material for forming the desired part or component. Successive layers may be built on top of the deposited layer via the laser metal deposition process in order to form the desired part or component. In an embodiment, the proportion of base metal powder to braze metal powders may be different layer-wise, i.e., a proportion of base metal powder to braze metal powder in a first layer may be different than in a successive layer. In this way, for example, cracks may be filled with a material having a higher proportion of braze metal powder to base metal powder, and the higher layers may have a higher proportion of base metal powder to braze metal powder where more strength is needed in the material for the component such as a turbine blade. In an embodiment, for example, additive material utilized to fill a crack may have a ratio of 80 wt. % base metal powder to 20 wt. % braze alloy powder where the additive material in a higher layer may have a ratio of 90 wt. % base metal powder to 10 wt. % braze alloy powder. Please check percentages again—are these accurate?

With continued reference to FIG. 1 and now to FIG. 2, an embodiment of a process 300 of manufacturing a sintered wire for in-situ feeding to a laser wire welding system 200 is provided. System components for manufacturing a sintered wire have been described previously. Assembling the system components may include providing at least two powder feed systems 220, 222 each containing a different powder alloy. Each powder alloy is fed 310 from its respective powder feed system 220, 222, via a feed line 224, to a mixing zone 236 of a container 238 within a pressure vessel 230. The mixing 320 is accomplished, via a rotating cone 232, in the container 238. The mixture of the at least two powders is then fed into a heating device 234 within the pressure vessel 230.

Within the pressure vessel 230, the heating device 234 is provided to perform a sintering process 330 on the mixture. In the sintering process 330, the mixture is heated to a high temperature just to or slightly above the melting point of the braze alloy powder. During the heating the braze material melts, but the base metal powder does not melt so that liquid phase sintering occurs and a sintered wire 50 is created. At this point, while the sintered wire 50 is still hot, for example 400-1000° C., the wire 50 may be continuously fed 340 in-situ to a weld head 204 for a laser metal deposition process. Alternately, the sintered wire 50 may be fed at a cooler temperature to the welding head 204 for laser metal deposition.

Referring now to FIG. 3, an embodiment of a method 400 for additively manufacturing or repairing a superalloy component is provided. For this embodiment, a base material or substrate of a superalloy component 10 is provided to a welding site for a repair and/or additive manufacturing process. At the site, as described above, at least two different powders may be sintered 410 by a heating device 234 at the site forming a sintered wire 50. The 'hot' sintered wire 50 may be continuously fed 420 to a welding head 204 of a laser wire welding system 200. In an embodiment, the sintered wire 50 is utilized in an additive manufacturing process or a repair process directly after its manufacture at the welding site.

It may be appreciated than in an embodiment where the component 10 is being repaired, the method may include steps for removing the component 10 from an industrial machine, and preparing the component 10 for the welding process by, for example, excavating any damaged portions of the component.

The additive manufacturing or repair process 400 may include directing 430 a laser beam 202 from the laser metal deposition system 200 towards the base material of the superalloy component 10. The laser energy creates a melt pool on the base material of the component 10. In this step, an end of the sintered wire 50, carried by the welding head 204 may be positioned within the melt pool of the base material. When the end of the sintered wire 50 comes into contact with the laser beam 202, the braze alloy material melts so that the molten braze material flows into the weld pool and upon cooling, solidifies to produce an additive layer 15 on the base material 10.

In order to create a layer 15 along a length of the component 10, the component may be moved relative to the laser metal deposition system 200 so that a layer of additive material may be disposed on the substrate as desired. It can be appreciated that a successive layer may be formed on the layer 15 repeating the laser processing and depositing steps until a shape or geometry of the desired component is achieved. In an embodiment, a structural repair of the component may be achieved utilizing the method as the molten braze may flow into a crack, for example, with the aid of capillary force.

The disclosed system for additively manufacturing and/or repairing a superalloy component via laser metal deposition allows an additive layer to be built on a base material utilizing a hot sintered wire continuously manufactured at the weld site while the additive layer is deposited. Thus, a hot sintered wire is directly welded after its manufacture. In this way, sintered wires may be manufactured from brittle material and directly welded due to the more ductile material properties of the wired in a heated condition. Additionally, the use of the disclosed sintered wire with the laser metal deposition process reduces contaminations common with powdered particles and alloys for structural repair of superalloy materials, as the sintered wire once processed provides for an identical or near identical chemical composition as the base material of the underlying component.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A system for additively manufacturing and/or repairing a superalloy component via laser metal deposition utilizing a sintered wire, comprising:
    a pressure vessel connected to a powder feed system for delivering at least two powders to a powder mixing zone of the pressure vessel;
    a heating device contained within the pressure vessel, the heating device configured to heat a mixture of the at least two different powders mixed in the powder mixing zone so that liquid phase sintering occurs creating a sintered wire;
    a laser wire welding system, comprising:
        a laser energy source operably configured to direct a laser energy towards a base material for forming a melt pool thereon and for laser processing the sintered wire deposited into the melt pool for forming a layer of additive material on the base material, and
        a welding head for receiving the sintered wire directly from the pressure vessel,
    wherein the sintered wire is continuously fed from the pressure vessel to the laser wire welding system.

2. The system as claimed in claim 1, wherein the additive material comprises a similar or a same composition as the base material.

3. The system as claimed in claim 1, wherein the at least two powders include a first powder comprising a base metal powder and a second powder comprising a braze alloy powder.

4. The system as claimed in claim 3, wherein the base metal powder is a nickel-based superalloy powder.

5. The system as claimed in claim 4, wherein the mixture comprises a ratio of (in a wt. %) nickel-based superalloy powder to (in a wt. %) braze alloy powder, and
    wherein the nickel-based superalloy powder lies in a range of 60-100% (in a wt. %) and the braze alloy powder lies in a range of 0-40% (in a wt. %).

6. The system as claim in claim 4, wherein the nickel-based superalloy powder is selected from the group consisting of CM247, Rene 80, IN738, and IN792.

7. The system as claimed in claim 3, wherein the braze alloy powder comprises the composition selected from the group consisting of: Amdry BRB, Amdry DR-4B, Ni—Cr—Ti, Ni—Cr—Zr—Ti, Ni—Ti—Zr, Ni—Cr—Hf—Zr, Ni—Cr—Ti—Hf, and Ni—Cr—Hf—Zr—Ti.

8. The system as claimed in claim 1, wherein the system further comprises at least two rollers for receiving the hot sintered wire from pressure vessel and for continuously feeding the sintered wire to the laser wire welding system.

9. The system as claimed in claim 3, wherein a successive layer is built on top of the deposited layer of additive material via the laser wire welding system.

10. The system as claimed in claim 9, wherein a first proportion of the first powder to the second powder of the deposited layer is different from a second proportion of the first powder to the second powder of the successive layer.

11. The system as claimed in claim 1, wherein the pressure vessel includes a rotating cone in a container for mixing the at least two powders.

12. A method additively manufacturing and/or repairing a superalloy component comprising:
    sintering of at least two different powders in a pressure vessel by a heating process so that a sintered wire is created;
    continuous in-situ feeding of the sintered wire to a weld head of a laser wire welding system;
    directing a laser beam from the laser wire welding system towards a base material of the superalloy component for forming a melt pool thereon and for processing the sintered wire deposited into the melt pool to form a layer of additive material on the base material.

13. The method as claimed in claim 12, wherein the at least two powders include a first powder comprising a base metal powder and a second powder comprising a braze alloy powder.

14. The method as claimed in claim 13, wherein the first powder is a nickel-based superalloy powder.

15. The method as claimed in claim 12, wherein the continuous in-situ feeding is accomplished utilizing a pair of rollers.

16. The method as claimed in claim 12, further comprising traversing the component comprising the base material relative to the laser wire welding system so that the layer of additive material is disposed on the base material as desired.

* * * * *